United States Patent [19]

Wisyanski

[11] 4,314,664
[45] Feb. 9, 1982

[54] THERMOSTAT ASSEMBLY

[76] Inventor: Thomas W. Wisyanski, c/o Century Brass Products, Inc., 59 Mill St., Waterbury, Conn. 06720

[21] Appl. No.: 105,235

[22] Filed: Dec. 19, 1979

[51] Int. Cl.³ .............................................. G05D 23/12
[52] U.S. Cl. ................................... 236/34.5; 251/337
[58] Field of Search ..................... 236/34, 34.5, 100; 251/337 X

[56] References Cited

U.S. PATENT DOCUMENTS

| | | | |
|---|---|---|---|
| 1,193,738 | 8/1916 | Thoms | 251/337 |
| 1,500,342 | 7/1924 | Smith | 251/337 X |
| 1,784,063 | 12/1930 | Giesler | 236/34.5 |
| 2,829,834 | 4/1958 | Drapeau et al. | 236/34 |
| 2,829,835 | 4/1958 | Branson | 236/34.5 |
| 2,847,165 | 8/1958 | Freismuth | 236/34.5 |
| 3,454,220 | 7/1969 | Bentz et al. | 236/34 |
| 3,734,405 | 5/1973 | Wagner | 236/34.5 |

Primary Examiner—William E. Tapolcai, Jr.

[57] ABSTRACT

To provide significant manufacturing and assembly cost savings in a rugged construction featuring a minimized number of simplified component parts, a thermostat is provided wherein an open-ended shell is mounted for movement toward and away from a fixed valve seat for controlling fluid flow responsive to a thermally responsive actuator, and a return spring assembly is provided for urging the shell in the direction of the valve seat which assembly includes means directly connected to the shell and providing a return spring seat for effecting transfer of the thermal actuator return spring load directly to the shell.

8 Claims, 3 Drawing Figures

THERMOSTAT ASSEMBLY

This invention generally relates to thermally responsive valve devices and particularly concerns a fluid line thermostat.

A primary object of this invention is to provide a new and improved thermostat of rugged construction for use under demanding conditions and which is quickly and easily manufactured and assembled with concomitant cost savings by virtue of simplified component parts featuring a unique return spring assembly.

Another object of this invention is to provide a new and improved thermostat of the type described which has a minimum of piece parts, is manufactured with minimized machining operations and wherein the number of assembly operations is reduced.

A further object of this invention is to provide a new and improved thermostat of the type described wherein the return spring assembly effects transfer of the power element return spring load directly to the valve or shell member.

Yet another object is to provide such a thermostat wherein the shell itself incorporates a flexible portion effecting an override safety function to protect the power element.

Other objects will be in part obvious and in part pointed out in more detail hereinafter.

A better understanding of the objects, advantages, features, properties and relations of the invention will be obtained from the following detailed description and accompanying drawings which set forth an illustrative embodiment and are indicative of the way in which the principle of the invention is employed.

IN THE DRAWINGS

Figure 1:
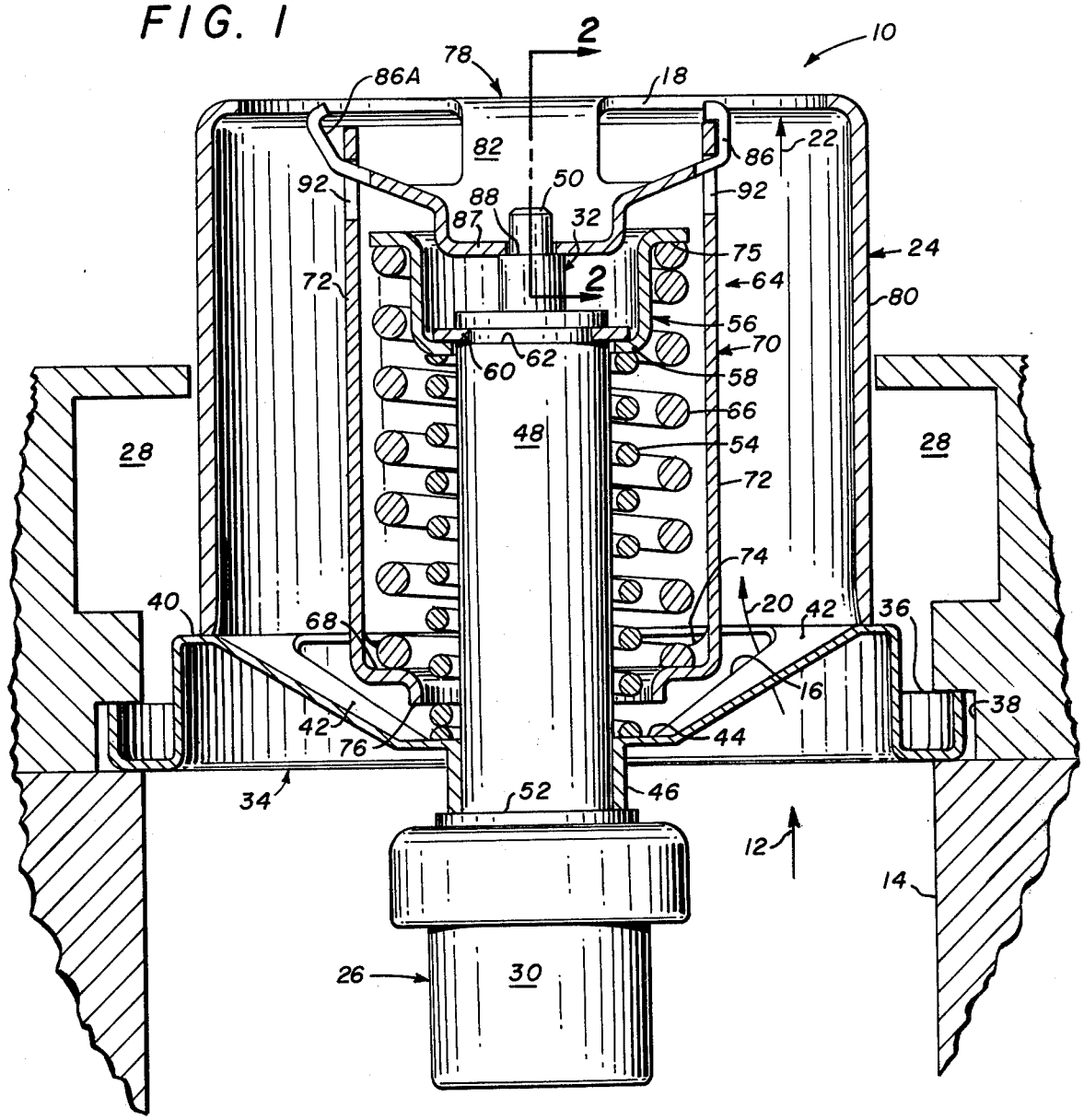
FIG. 1 is a side elevational view, partly broken away and partly in section, showing a thermostat incorporating this invention.

Referring to the drawings in detail, thermostat 10 is of a type which is temperature actuated and is useful in a wide variety of applications. For purposes of illustration only, the thermostat 10 will be understood to be mounted in an engine block, and coolant flows in the direction of arrow 12, e.g., from a jacket 14 of the engine through thermostat ports such as at 16 and 18 as indicated by fluid flow path arrows 20 and 22 into a bypass flow passage which will be understood to communicate with ports 18. Thermostat 10 is shown in a typical installation wherein a fast-acting, temperature responsive valve actuator or thermostatic power element 26 is mounted to be disposed within the engine jacket 14 so as to be responsive to the temperature of the fluid or coolant which is to be controlled. Upon axial movement of metering valve or shell 24 upwardly from its position shown in FIG. 1, fluid flow is also established between jacket 14 and flow passage 28 which communicates, e.g., with an engine radiator, not shown.

The thermostat position shown in FIG. 1 is a so-called cold or start position wherein coolant flows from jacket 14 through thermostat 10 and into the bypass flow passage surrounding the top of the hollow open-ended shell 24 which is of an inverted cuplike construction. Upon sensing increased temperatures above a predetermined value, thermostat 10 is actuated by its power element 26 to move shell 24 upwardly to decrease coolant flow through the bypass and to increase coolant flow to the engine radiator. When sufficient coolant has been directed through the radiator to reduce engine temperature to a desired predetermined value, the changed temperature of the coolant in jacket 14 will deactivate the power element 26 and effect return of shell 24 toward its illustrated position in FIG. 1. While not shown, it is to be understood that provision may be made in the bypass conduit, if desired, to arrest the upward movement of shell 24 and close ports 18 upon a predetermined movement of shell 24 responsive to continued increase of coolant temperature to force all flow through the engine radiator passage 28.

The power element 26 is conventional and includes a casing 30 within which is contained a special pellet mix of a suitable thermally sensitive material that expands and contracts, respectively, in response to increases and decreases in temperature. The chemical composition of the mix may be varied to create desired operating temperature ranges. A molded elastomeric diaphragm, not shown, seals off the pellet mix within casing 30, and a thermally expansible plug may be employed in conjunction with the pellet mix to transmit any volumetric expansion of the expansible materials to a power element piston 32 which is drivingly engaged with shell 24 to move it upwardly from its illustrated position in FIG. 1.

In the preferred embodiment, shell 24 is axially movable toward and away from a seat-forming annular head 34. Head 34 has a peripheral mounting rim 36 of U-shaped cross-section shown fixed in an annular recess 38 in the engine block. An annular valve seat 40 is integrally formed on the inner portion of rim 36 and provided with a plurality of legs 42 extending obliquely downwardly and inwardly to a central base 44 of the head. The central base 44 has a depending sleeve 46 which defines a center opening in head 34, the legs 42 defining the plurality of ports 16 in the head 34.

To mount power element 26, its longitudinally extending piston guide 48 and exposed piston stem 50 is inserted through sleeve 46 until power element shoulder 52 abuts sleeve 46 and is maintained in that position by mounting spring 54. Spring 54 is shown seated between the central base 44 of head 34 and the bottom of a spring retainer cup 56 with the spring 54 coaxially coiled in surrounding adjacent relation to the power element piston guide 48. Spring retainer cup 56 is open at both ends and has a generally S shaped half-section. Cup 56 is coaxially mounted adjacent an end of piston guide 48 to surround piston stem 50. More specifically, the bottom of spring retainer cup 56 is defined by a radially inwardly directed annular flange 58 which serves as a seat for spring 54 and defines an opening through which the power element piston guide 48 extends. A retaining snap ring 60 is fitted and locked into a groove 62 circumferentially extending about the end of piston guide 48 whereby spring retainer cup 56 is firmly secured to the power element 26 and is completely restrained between retaining ring 60 and spring 54 with the spring 54 maintaining the power element in abutting operative position against central sleeve 46 of head 34. A further advantage of the disclosed construction is that upon assembly, the ring 60 is trapped in position within the confines of the cup 56 and is maintained therein in a vibration resistant assembly under the bias of spring 54.

To provide a self-contained, unitary return spring assembly 64 of simplified construction to achieve significant cost savings in manufacture and assembly while providing effective vibrational resistance under demanding environmental conditions, a return drive connection for the shell 24 and power element piston 32 is effected between return spring 66 and shell 24 by means of a return spring seat 68 directly connected to the shell, preferably in symmetrical relation to longitudinal axes of power element 26 and shell 24. The preferred embodiment of the return spring assembly 64 includes a bracket 70 of generally U shaped profile having spaced arms 72, 72 interconnected at their base by a ring serving as spring seat 68 having an upstanding annular lip 74 for confining one end of the return spring 66. Its opposite end is seated against an annular radial flange 75 of spring retainer cup 56 which, as previously described, is fixed to power element 26. As seen in FIG. 1, the innermost portion of bracket ring 68 is turned downwardly at 76 and defines a central opening within which spring 54 is received with adequate clearance relative to power element piston guide 48 and surrounding bracket 70. The bottom of bracket 70 is shown spaced a predetermined distance above the center base 44 of head 34.

Figure 2:
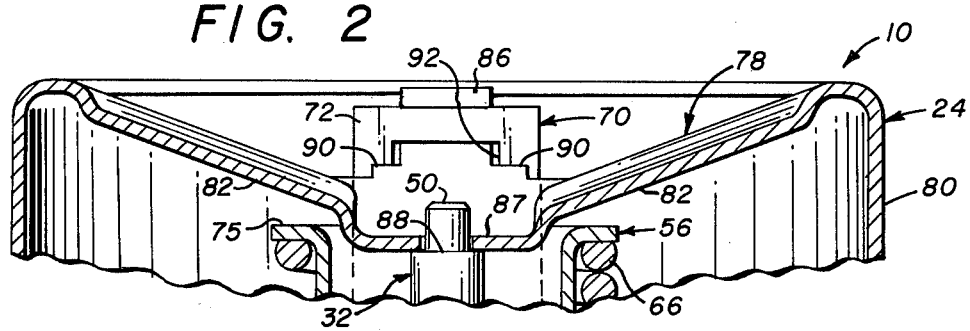
FIG. 2 is an enlarged sectional view taken along line 2—2 of FIG. 1.
Figure 3:
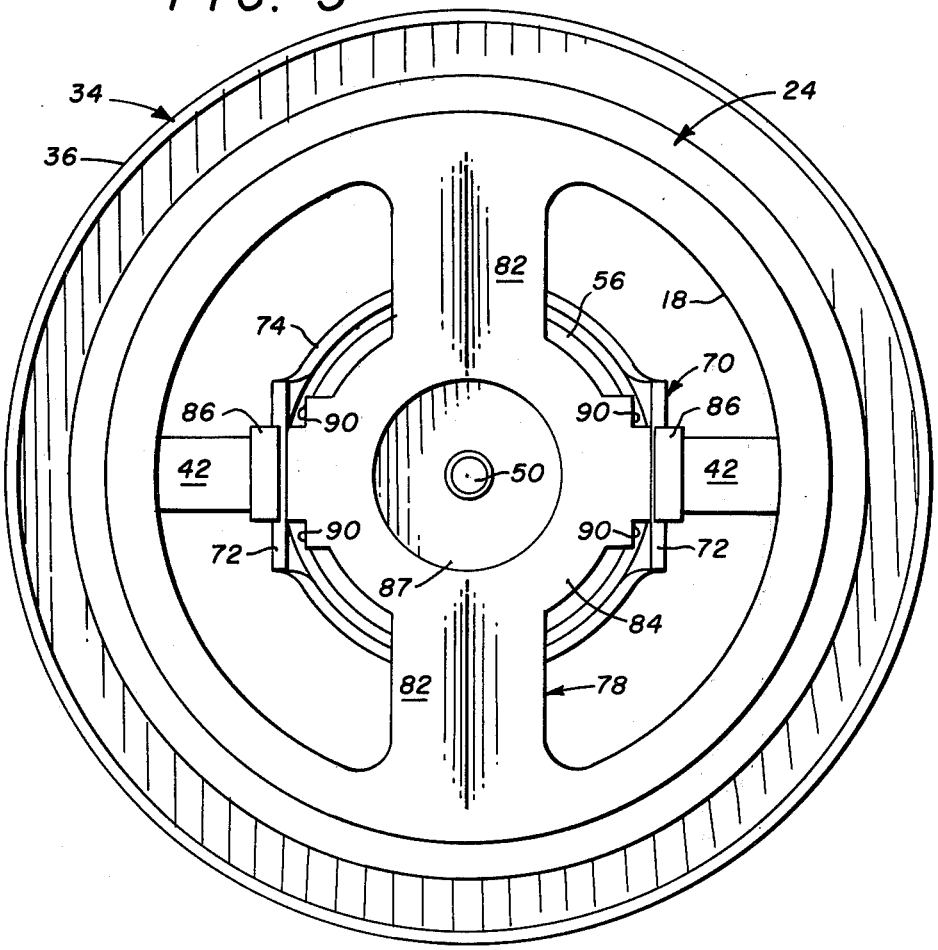
FIG. 3 is a top plan view of the thermostat of FIG. 1.

To directly connect the return spring 66 and shell 24, and thereby minimize heretofore high-cost piece parts and multiple manufacturing and assembly operation requirements, an upper web 78 of shell 24 is formed integral with tubular shell side wall 80 to provide obliquely downwardly directed, flexible legs 82 merging with a center hub 84 (FIG. 3) having two diametrically opposed locking hooks 86, 86 supporting bracket 70. In the preferred embodiment, center hub 84 is illustrated as having an apertured center cuplike portion 87 of U-shaped cross section through which piston stem 50 freely extends in coaxial relation to shell 24 to provide direct abutting driving engagement between the shell web 78 and shoulder 88 (FIGS. 1 and 2) formed on piston 32 and surrounding the reduced diameter stem 50 of the piston. To provide return spring bracket support and effect direct transfer of the power element return spring load to shell 24, locking hooks 86, 86 each extend from a pair of retaining shoulders 90, 90 (FIGS. 2 and 3) formed on the center hub 84 through an opening 92 in an upper end portion of each arm 72, 72 of bracket 70. The retaining shoulders 90, 90 are engageable with their respective bracket arm 72 at opposite sides of its bracket opening 92. Each locking hook 86, 86 is initially inserted through its respective bracket opening 92 as seen at 86A in FIG. 1 and thereafter the reversely bent terminal end of each hook is bent toward the opposite hook into final assembled position such as shown at 86 in FIG. 1. By virtue of the upwardly directed angular inclination of each locking hook 86, 86, a ramp is effectively provided below the upper terminal ends of each bracket arm 72 which is brought into direct engagement with its respective arm 72 upon assembly to prevent any undesired relative movement. The completed bracket/web connection is of direct metal-to-metal engagement to provide a reliable vibration resistant connection of high integrity.

In operation, as piston 32 is driven upwardly from its illustrated start position of FIG. 1 in response to coolant temperature increase, coolant passes between shell 24 and valve seat 40 into passage 28 leading to the engine radiator. Under normal operating conditions, piston guide 48 remains in fixed position as does the attached spring retainer cup 56 upon upward shell movement which compresses return spring 66 in response to movement of return spring seat 68 as the shell supported bracket 70 follows the upward shell movement. After sufficient coolant has flowed through the engine radiator to effect a coolant temperature decrease sensed by the thermally expansible pellet mix within casing 30 in jacket 14, the pellet mix contracts and the locking hooks/bracket arms connection between the shell 24 and return spring assembly 64 effects a direct transfer of the thermal element return spring load to the shell 24 to return the piston 32 and shell 24 toward start position as illustrated in FIG. 1.

Proper design of the flexible web material permits elimination of a conventional override spring in particular applications, for the disclosed flexibility of the web material itself permits relative movement between the piston 32 and shell 24 upon arrest of the shell, e.g., by abutting a fixed member, not shown, overlying the shell 24 in the bypass. As an example, were cup 56 completely restrained against movement relative to piston guide 48 and were the power element 26 fixed in relation to head 34, mounting spring 54 in the specific illustrated embodiment could be eliminated and upon arrest of upward shell movement, the flexible web material would serve to protect the power element upon thermal excursion of its piston 32 beyond a predetermined maximum movement responsive to excessive coolant temperature increase.

As will be apparent to persons skilled in the art, various modifications, adaptations and variations of the foregoing specific disclosure can be made without departing from the teachings of the present invention.

I claim:

1. A fluid thermostat comprising a fixed annular valve seat, a hollow open-ended shell movable toward and away from the valve seat and serving as a valve member for metering fluid flow between the shell and valve seat, the shell including a tubular sidewall and a web formed on one end of the sidewall, a thermally responsive actuator including a longitudinally extending piston guide, an axially reciprocable piston supported for movement in the piston guide and movable in a first direction for driving the shell in a corresponding direction away from the valve seat in response to fluid temperature increase, and a return spring assembly urging the shell in the opposite direction toward the valve seat, the return spring assembly including a bracket having a generally U shaped profile with spaced arms and an interconnecting annular base in symmetrical surrounding relation to the piston guide, and a return spring coaxially coiled about the piston guide with one end of the spring seated in fixed relation to the piston guide and the opposite end of the spring seated on the annular base of the bracket, the web of the shell having a center hub disposed between the bracket arms and coaxially supported on the piston in driving engagement therewith, the web center hub having a pair of diametrically opposed locking hooks, each of the bracket arms having a hook receiving opening in an end of the arm opposite the annular base of the bracket, the locking hooks of the web center hub extending through the openings of the bracket arms and being respectively reversely bent toward the other hook in engaged locking relation with their respective arms and connecting the return spring to the shell for effecting transfer of return spring load directly to the shell.

2. A fluid thermostat comprising a fixed annular valve seat having an apertured center base, a hollow open-ended shell movable toward and away from the valve seat and serving as a valve member for metering fluid flow between the shell and valve seat, a thermally responsive actuator including a longitudinally extending piston guide, an axially reciprocable piston supported for movement in the piston guide, an end of the piston guide including a circumferentially extending groove adjacent an exposed end of the piston, a retaining snap ring being secured in the groove, an annular spring retainer cup being mounted in coaxial surrounding relation to the piston guide, the spring retainer cup having a generally S shaped half section with radially inwardly and outwardly directed annular flanges serving as spring seats, a mounting spring being coaxially coiled about the piston guide with opposite ends of the mounting spring being seated on the center base of the valve seat and on the radially inwardly directed flange of the spring retainer cup urging it into engagement with the retaining snap ring in fixed relation to the piston guide and maintaining the snap ring in captured relation within the confines of the spring retainer cup, the piston being movable in a first direction for driving the shell in a corresponding direction away from the valve seat in response to fluid temperature increase, and a return spring assembly urging the shell in the opposite direction toward the valve seat, the return spring assembly including a bracket having a generally U shaped profile with spaced arms and an interconnecting annular base in symmetrical surrounding relation to the piston guide, the ends of the bracket arms opposite the annular base being directly connected to the shell, and a return spring coaxially coiled about the piston guide in coaxial surrounding relation to the mounting spring, one end of the return spring being seated on the radially outwardly directed flange of the spring retainer cup, whereby it is securely restrained for maximum vibrational resistance, and the opposite end of the return spring being seated on the annular base of the bracket with said annular base comprising a return spring seat.

3. The thermostat of claim 1 or 2 wherein the return spring assembly additionally urges the piston in a direction opposite its said first direction of movement for returning the piston to its start position.

4. The thermostat of claim 1 wherein the locking hooks of the web center hub are connected to their respective bracket arms in direct metal-to-metal engagement to provide a positively locked connection between the shell web and bracket of high integrity to resist undesired vibration.

5. The thermostat of claim 4 wherein the locking hooks are each directed obliquely upwardly through an opening in their respective bracket arms to provide a fulcrum for reversely bending the locking hooks into final assembled position.

6. The thermostat of claim 2 wherein the thermally responsive actuator includes a casing of enlarged diameter relative to its piston guide, the piston guide and casing being coaxially aligned with the piston guide extending through the apertured center base, of the valve seat the mounting spring urging the casing into an operative position in abutting engagement with the center base of the valve seat.

7. A fluid thermostat comprising a fixed annular valve seat, a hollow open-ended shell movable toward and away from the valve seat and serving as a valve member for metering fluid flow between the shell and valve seat, the shell including a tubular sidewall and web formed on one end of the sidewall, a thermally responsive actuator including an axially reciprocable piston, the actuator including a longitudinally extending piston guide supporting the piston for movement in the guide, the piston being movable in a first direction for driving the shell in a corresponding direction away from the valve seat in response to fluid temperature increase, and a return spring assembly urging the shell in the opposite direction toward the valve seat, the return spring assembly including a bracket having a generally U shaped profile with spaced arms and an interconnecting annular base in symmetrical surrounding relation to the piston guide and a return spring coaxially coiled about the piston guide, one end of the spring being seated in fixed relation to the piston guide and the opposite end of the spring being seated on the annular base of the bracket which serves as a return spring seat, the ends of the bracket arms opposite the annular base being directly connected to the web of the shell in fixed assembly therewith.

8. The thermostat of claim 1 wherein the web material is flexible and permits relative movement between the piston and shell upon arrest of shell movement, whereby the flexible web provides a resilient override function for protecting the thermally responsive actuator upon thermal excursion of the piston beyond a predetermined maximum movement in response to excessive fluid temperature increase.

* * * * *